Figure 1:
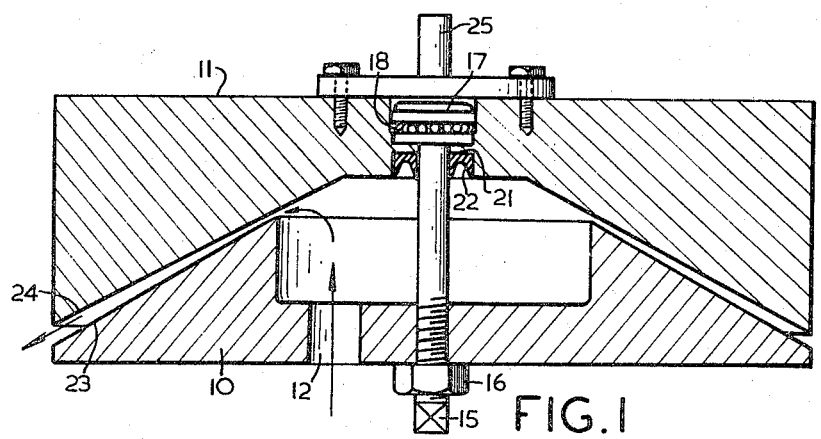

April 4, 1967     R. H. BURGESS     3,312,450

ROTARY FLUID MOTOR

Filed Dec. 28, 1965

INVENTOR
ROBERT HENRY BURGESS

By: *McGrew and Toren*
        *Attorneys*

United States Patent Office 3,312,450
Patented Apr. 4, 1967

3,312,450
ROTARY FLUID MOTOR
Robert Henry Burgess, 259 Hume Highway, South Strathfield, New South Wales, Australia
Filed Dec. 28, 1965, Ser. No. 516,903
Claims priority, application Australia, Jan. 8, 1965, 53,686/65
7 Claims. (Cl. 253—96)

The present invention relates to means for utilising the kinetic energy of a liquid or other fluid for producing a rotary motion.

The invention is an extension of the invention described in United States patent application 368,096 filed May 18, 1964. The invention disclosed in that application consists in a means for utilising the kinetic energy of a fluid, having a stator and a rotor, arranged so as to define between them an annular space the radial width of which is restricted over a portion of its axial length, the rotor being mounted so as to be freely rotatable about the axis of said annular space and so as to be free to tilt or rock about a point on or close to said axis, the construction being such that fluid may be passed through said annular gap to cause rotation of the rotor.

It was believed that in order to produce a rotation of the stator it was necessary for the annular space to extend in a substantially axial direction with the flow of fluid in that direction.

It has now been found that results substantially the same as those obtained with the apparatus described in the earlier filed application may be obtained with a modified arrangement in which the rotor and stator can take a variety of different forms provided that they have working faces spaced apart by a short distance, with there being an annular restriction of this space at the upstream end thereof and concentric or nearly concentric with the axis of the rotor. With such arrangements, rotation of the rotor can be produced by means of a stream of fluid, part at least of which passes substantially radially through the annular space. It would appear, although this has not been established as a matter of certainty, that fluid passing through the clearance between the unstable rotor and the stator causes a partial vacuum to form at a point remote from the axis, causing the rotor to tilt in that direction. This will in effect shut off flow at that point while permitting it to take place at points on the other side of the axis which in turn will cause the rotor to tilt back. The rotor apparently tilts on a chord of the annular restriction rather than about a diameter, and thus a rolling motion is imparted to the rotor causing a point on its circumference to rotate gradually. It will be seen that the mode of operation is much the same as in the devices described in the above-mentioned application.

Figures 2, 3:
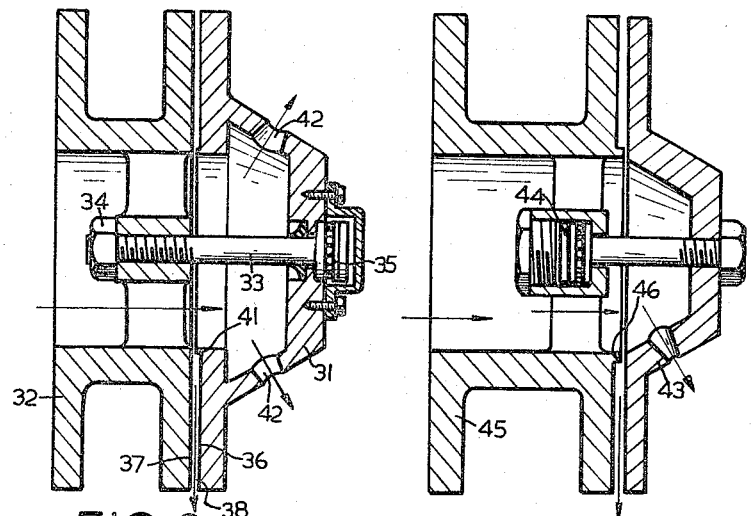

In order that the invention may be better understood and put into practice, preferred embodiments thereof are hereinafter described, by way of example, with reference to the accompanying drawings in which:

FIG. 1 is a cross-sectional elevation of a fluid motor constructed according to the invention, FIG. 2 is a cross-sectional elevation of a rotary water spraying device according to the invention, and FIG. 3 is a cross-sectional elevation of a similar device of somewhat different construction.

In FIG. 1 a fluid motor consists of a stator 10 and a rotor 11. The stator 10 has a fluid inlet port 12 leading to an internal cavity 13. A vertical shaft 14 is threaded at its lower end, which end is screwed into the center of the stator 10 and projects from the stator; it is formed with flats 15 by means of which the shaft can be turned in relation to the stator by means of a spanner or wrench. This enables the position of the stator 10 to be raised or lowered in relation to the rotor 11. The stator may be locked in any adjusted position by the lock nut 16.

The shaft 14 is provided at its upper end with a head 17 which rests on the upper race of a thrust bearing 18, the lower race of which is supported on the flange 21 formed integrally with the rotor 11. A fluid tight seal 22 is provided below the flange 21 to prevent the escape of fluid from the interior of the rotor through the thrust bearing 18.

It should be noted that the thrust bearing 18 is designed and arranged to take the fluid thrust on the underside of the rotor and which, in use, exceeds the weight of the rotor.

The stator 10 is provided on its upper surface with a frusto-conical face 23 and the rotor 11 is provided on its lower surface with a frusto-conical face 24. The solid angles included by each of these two faces is such that they make an angle between themselves of between approximately 1° and 5°. The annular gap between the surfaces 23 and 24 is narrowest at its inner end and it is this portion which constitutes the annular restriction through which fluid flow produces rotation of the rotor relative to the stator under the condition discussed above and described in the above-mentioned application.

An output shaft 25 is attached to the rotor and a drive may be taken from this through a flexible shaft which will permit the necessary tilting as well as rotation of the rotor.

In operation, fluid under pressure is introduced into the inlet port 12 and after passing into the cavity 13 flows out through the annular gap between the surfaces 23 and 24. As wear may take place due to the fluid flow through the gap, the sides of the gap may be lined with removable rings of wear resisting material.

The embodiments shown in FIGS. 2 and 3 are for convenience shown on their sides; in practice the axis of rotation in each case would normally be vertical.

In FIG. 2 a rotor 31 is supported on a stator 32 by a shaft 33 the end of which is screwed into the stator and locked by means of a lock nut 34. The upper end of the shaft 33 carries a thrust bearing 35 arranged in the same manner as the bearing 18 of FIG. 1.

The rotor 31 and stator 32 are provided respectively with flat annular faces 36 and 37 defining between them a gap 38. At the inner edge of the gap 38 an annular ridge 41 is formed on the rotor 31 to form, in the gap 38, an annular restriction at the upstream end of the gap.

This embodiment of the invention is intended as a rotary spray and two jets 42 are provided in the rotor. In use water is supplied under pressure to the stator in the direction of the arrow. Part of the flow passes through the gap 38 to produce rotation of the rotor and the remainder through the jets 42 to produce rotating sprays of water for irrigation or other puposes.

The embodiment shown in FIG. 3 is very similar to that shown in FIG. 2 in construction and function, with the principal exception that the rotor 43 is supported on a thrust bearing 44 carried in a housing at the center of the stator 45. The annular restriction is in this case produced by an annular ridge 46 on the stator.

A variety of other arrangements may be adopted within the general scope of the invention. It would be possible for example for the stator to be in the form of a plate and the rotor in the form of a cylindrical casing. The working faces of the rotor and stator do not need to be circular and may be flat, conical, concave or convex provided that an annular restriction is provided where fluid is introduced. The point about which the rotor is able to tilt may be anywhere on the axis of the rotor or may be displaced slightly from the axis. Such displacement can be used in ensuring that the rotor starts rotating in a desired direction each time the device is put into operation. It is not necessary for the rotor to be supported by an actual pivot point; the rotor may be supported on an annular track which allows it to rotate and also to tilt. Means may be provided to produce a back pressure on the fluid after passing through the annular restriction by the introduction of a second restriction downstream as described in the abovementioned application.

As compared with the devices described in the abovementioned application, devices constructed in accordance with the present invention can be made somewhat more compact due to the fact that the flow of the working fluid, that is to say the fluid which actually causes rotation of the rotor, is in a radial rather than an axial direction. A further advantage lies in the fact that in devices according to the present invention the effective width of the annular restriction may be very readily adjusted by relative axial movement of the rotor and the stator.

It should be made clear that in any form of the invention, while the rotor must be freely rotatable about its axis and must be free to tilt or rock about a point on or close to the axis, tilting and rotation may occur at different points in the system. The rotor, for example, may be rotatably mounted by means of a bearing on an intermediate member which itself is tiltably mounted but restrained from rotation. The essence of the matter is that the pivot point may be restrained to allow tilting only, rotation being allowed to take place at some other point concentric to but not necessarily in the same plane as the pivot point.

It will be readily appreciated that a wide variety of other applications of the invention are possible and that the embodiments described above are given only by way of example.

What I claim is:

1. A rotary device, using the kinetic energy of a fluid, comprising, in combination, a stator element; a rotor element; said elements having an axis of relative rotation and being constructed and arranged to define therebetween a narrow annular space substantially concentric with said axis; means mounting said rotor element for free rotation about said axis, and for tilting about a point substantially on said axis, both relative to said stator element; means defining a fluid flow path directing fluid under pressure to flow through said narrow annular space in a substantially radial direction relative to said axis; and means at the upstream end of said annular space constituting an annular restriction of said space; whereby the vacuum downstream of said annular restriction will cause said rotor element to tilt to engage said stator element at a point blocking fluid flow, causing a progressive angular shift of said point with rolling of said rotor element about said stator element.

2. A rotary device as claimed in claim 1 wherein the means defining the fluid flow path are such that the direction of flow is outwards from said axis.

3. A rotary device as claimed in claim 1 including means for adjusting the relative axial positions of the stator and rotor elements, whereby the axial width of said annular space may be varied.

4. A rotary device as claimed in claim 1 wherein the means defining a fluid flow path include a fluid inlet in said rotor element, means defining a cavity between the rotor and stator elements and at least one jet aperture in the rotor element, the arrangement permitting fluid to pass from said cavity both through the said annular space and through the jet aperture.

5. A rotary device as claimed in claim 1 wherein the rotor element is provided with a power take-off connection through which power may be taken from the rotor element.

6. A rotary device, as claimed in claim 1, in which said narrow annular space is substantially frusto-conical.

7. A rotary device, as claimed in claim 1, wherein said annular space extends substantially parallel to a diametric plane of said axis.

References Cited by the Examiner
UNITED STATES PATENTS 2,872,104  2/1959  Cizinsky.

FOREIGN PATENTS 1,001,387  10/1951  France.
250,207  2/1927  Great Britain.
367,566  1/1939  Italy.
228,047  10/1934  Switzerland.

MARTIN P. SCHWADRON, *Primary Examiner.*

E. A. POWELL, *Assistant Examiner.*